Figure 9:
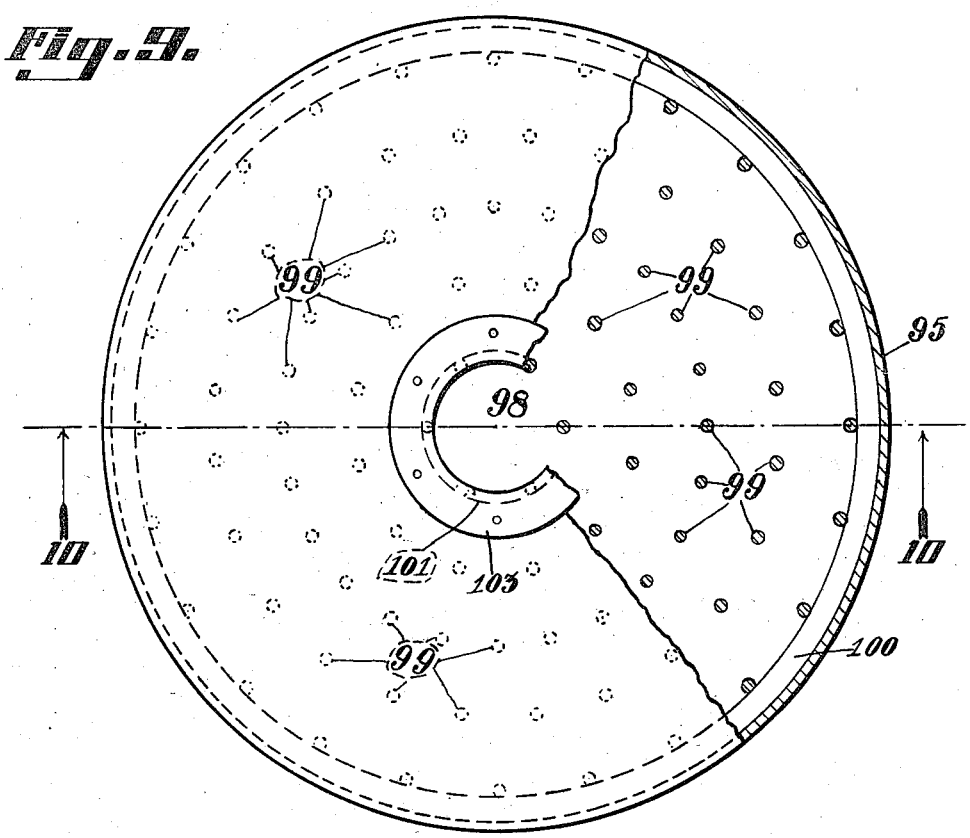

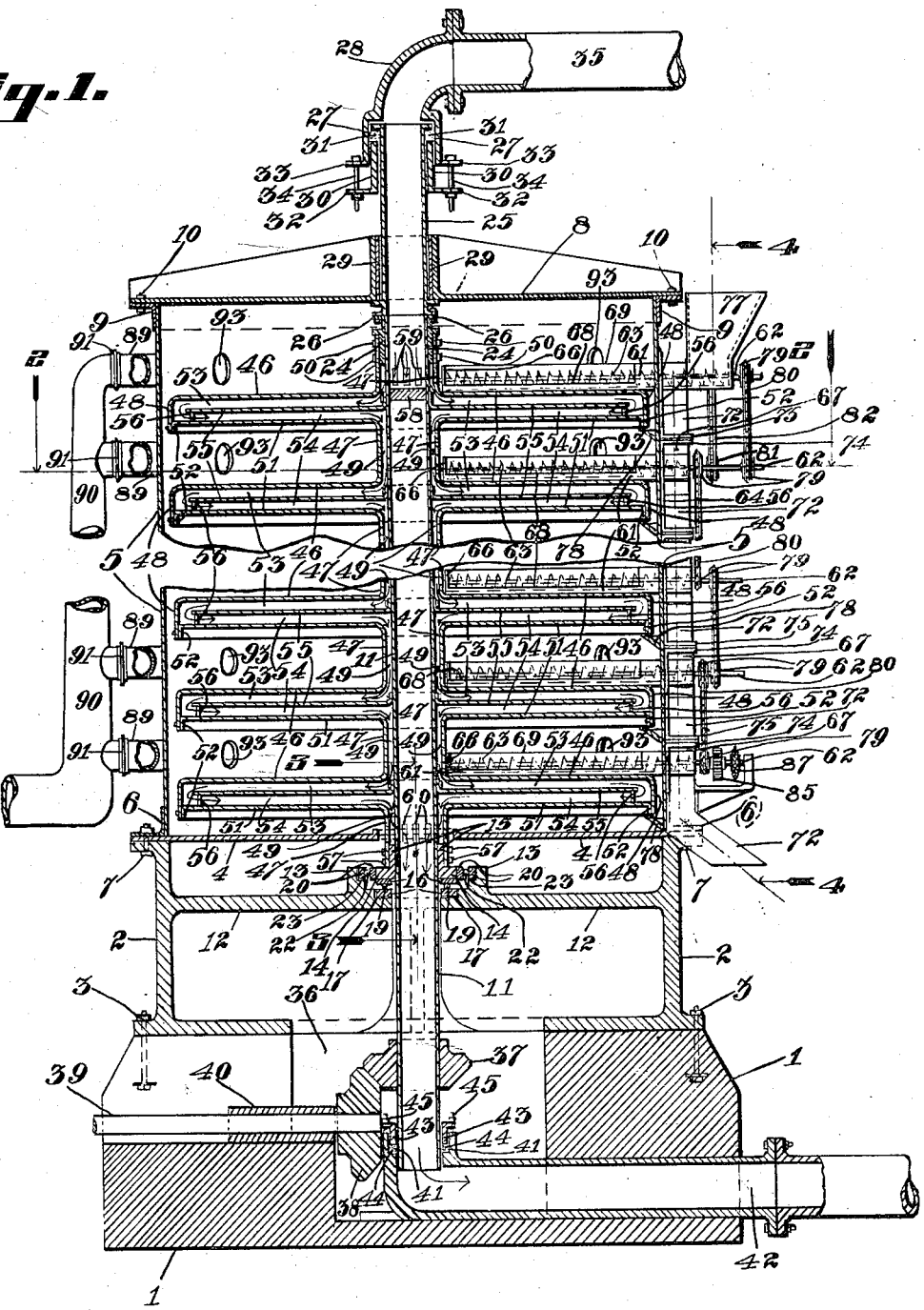

W. R. MACKLIND.
ROTARY DISK DRIER.
APPLICATION FILED JULY 28, 1910.
1,001,660.
Patented Aug. 29, 1911.
5 SHEETS—SHEET 2.
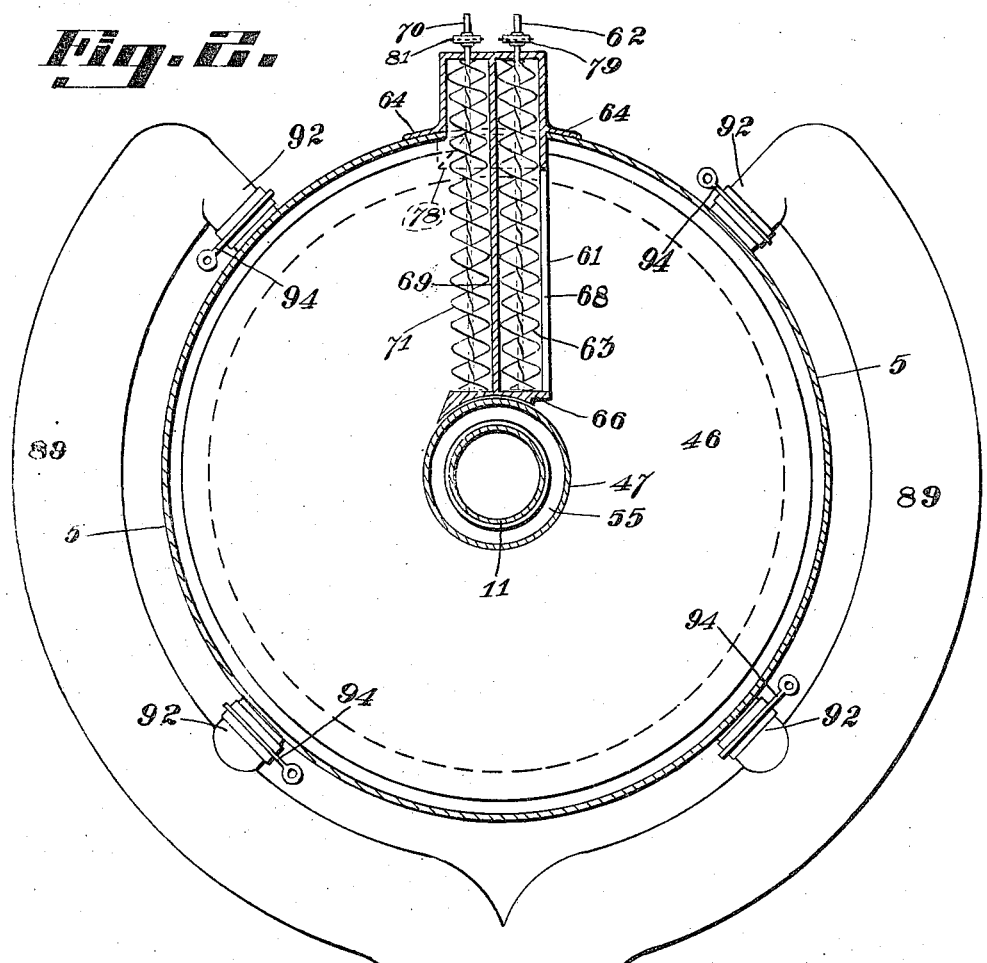
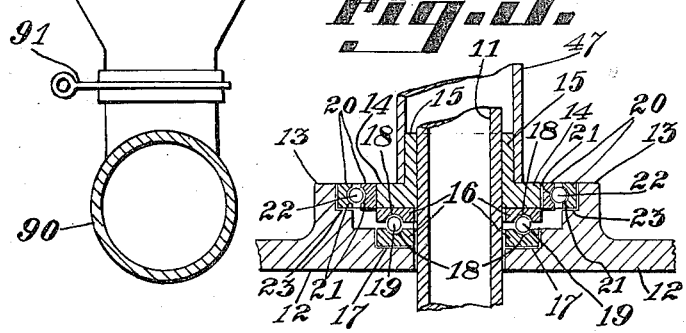
Witnesses:
George G. Anderson.
Harry H. Peiss
Inventor:
William R. Macklind,
By Hugh K. Wagner
His Attorney.

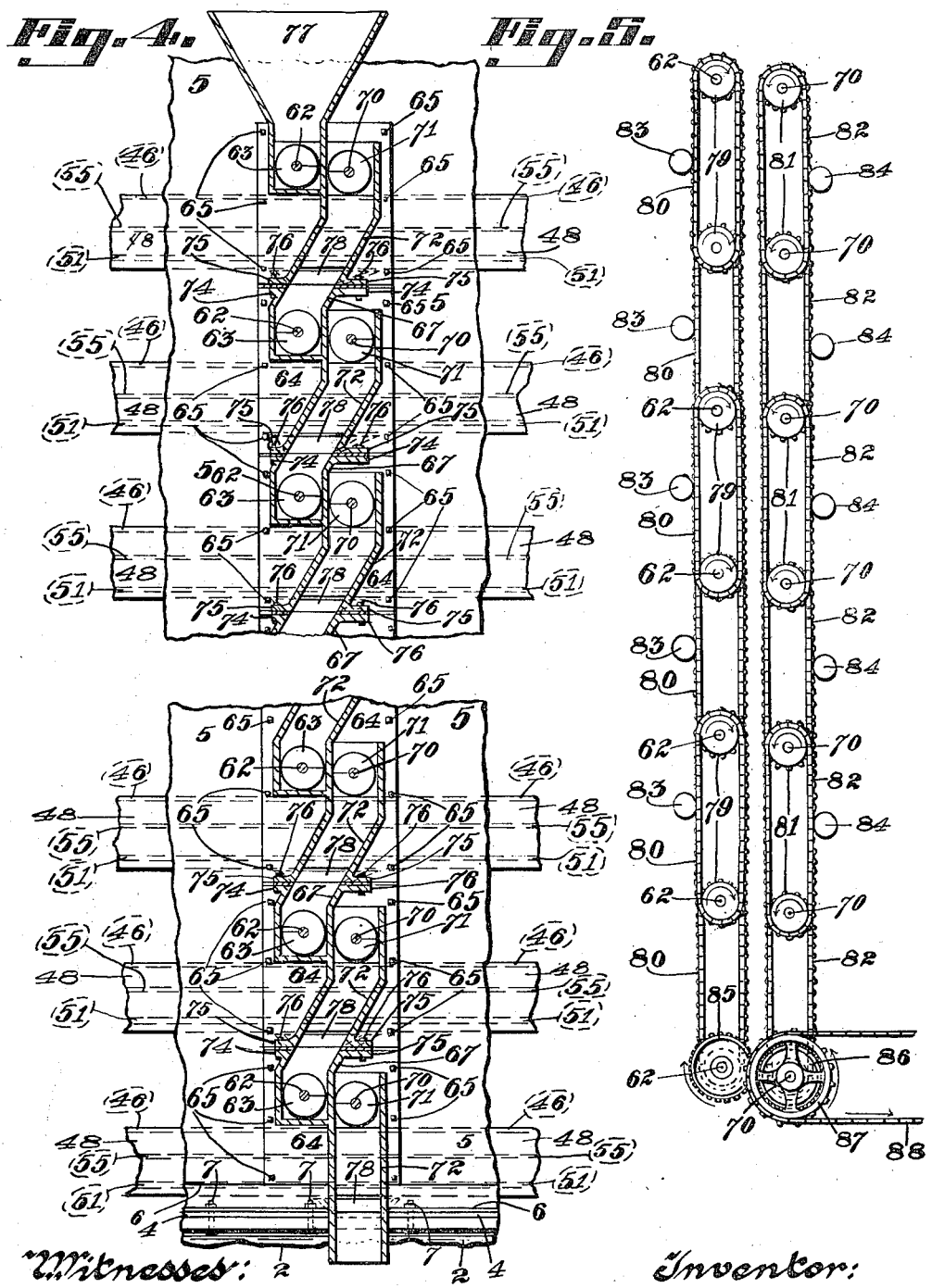

W. R. MACKLIND.
ROTARY DISK DRIER.
APPLICATION FILED JULY 28, 1910.
1,001,660.
Patented Aug. 29, 1911.
5 SHEETS—SHEET 4.
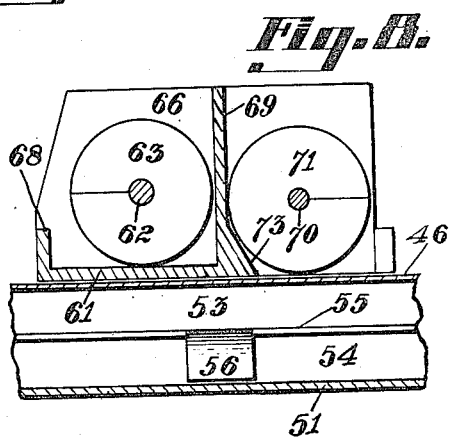
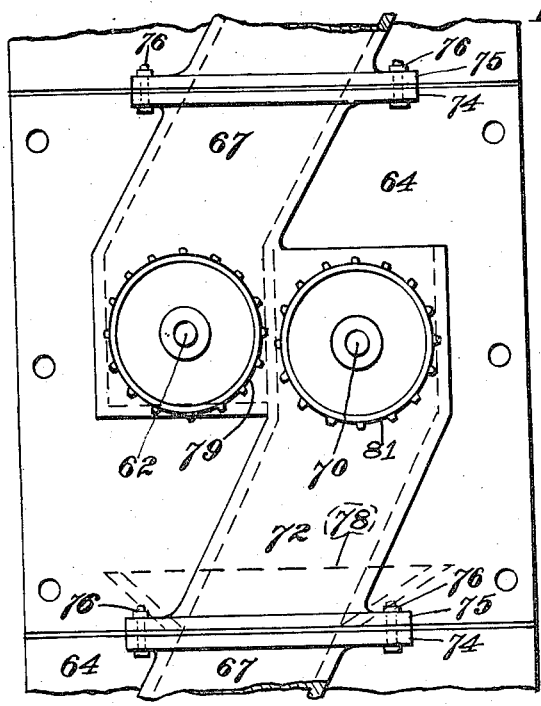
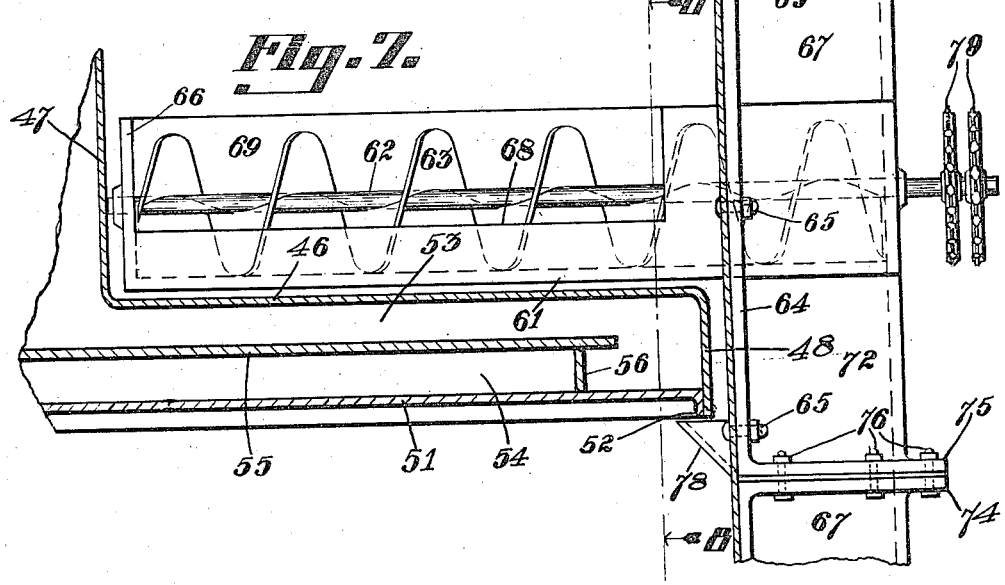
Witnesses:
George D. Anderson
Harry H. Peiss
Inventor:
William R. Macklind,
By Hugh K. Wagner
His Attorney.

W. R. MACKLIND.
ROTARY DISK DRIER.
APPLICATION FILED JULY 28, 1910.

1,001,660.

Patented Aug. 29, 1911.

5 SHEETS—SHEET 5.

Witnesses:
George G. Anderson.
Harry H. Peiss.

Inventor:
William R. Macklind,
By Hugh K. Wagner
His Attorney.

ically adapted to be used for drying spent grains, fibrous pulps, tankage, etc., and has for one of its objects to provide a machine in which a plurality of rotary disks are arranged one above another and are hollow, so that heat in the form of steam, or the like, can pass therethrough for the purpose of heating said disks in order to dry the material that comes in contact therewith.

UNITED STATES PATENT OFFICE.

WILLIAM R. MACKLIND, OF MINERAL POINT, MISSOURI.

ROTARY-DISK DRIER.

1,001,660.

Specification of Letters Patent.  Patented Aug. 29, 1911.

Application filed July 28, 1910. Serial No. 574,218.

*To all whom it may concern:*

Be it known that I, WILLIAM R. MACKLIND, a citizen of the United States, residing at the city of Mineral Point, in the county of Washington and State of Missouri, have invented certain new and useful Improvements in Rotary-Disk Driers, of which the following is a specification, reference being had therein to the accompanying drawings.

This invention relates to drying machines and is particularly adapted to be used for drying spent grains, fibrous pulps, tankage, etc., and has for one of its objects to provide a machine in which a plurality of rotary disks are arranged one above another and are hollow, so that heat in the form of steam, or the like, can pass therethrough for the purpose of heating said disks in order to dry the material that comes in contact therewith.

Another object of this invention is to provide each disk with feeding and discharging means, the feeding means being arranged to load said disk with material to be dried and the discharging means being arranged to deliver the material from said disk to the feeding means of a subjacent disk, and so on until the discharging means of the bottom disks discharges the material from the machine.

Further this invention consists in the provision of means for forcing heat through the hollow disks in order to heat same so that, as the material to be dried passes from the top to the bottom disks, said material comes in contact with all of the heated disks and becomes thoroughly dried by the time same discharges from the bottom disk.

With these objects in view, this invention consists in certain novel features of construction and arrangements of parts, as hereinafter more fully described and pointed out in the claims.

Figure 10:
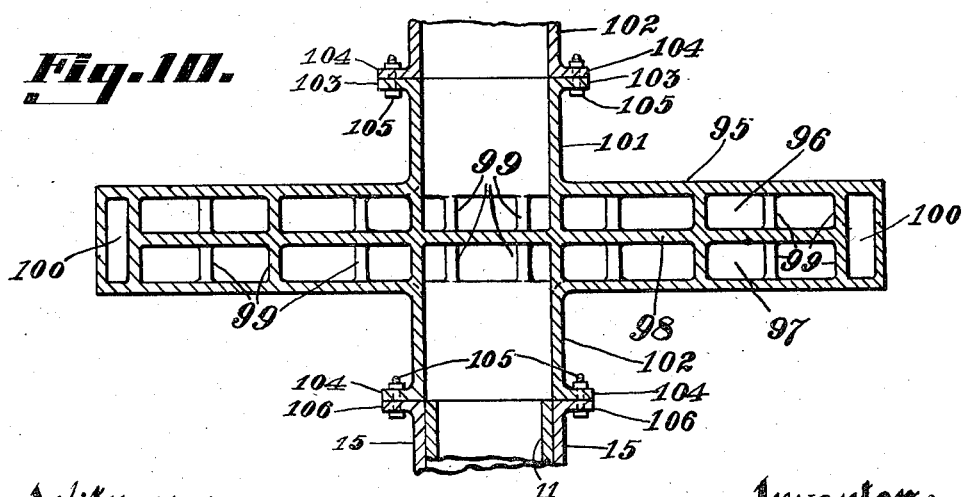

In the accompanying drawings forming part of this specification, in which like numbers of reference denote like parts wherever they occur, Figure 1 is a vertical sectional view of a machine embodying this invention; Fig. 2 is a horizontal sectional view, on an enlarged scale, on the line 2—2, Fig. 1; Fig. 3 is a sectional view, on an enlarged scale, on the line 3—3, Fig. 1; Fig. 4 is a vertical sectional view, on an enlarged scale, on the line 4—4, Fig. 1; Fig. 5 is a diagrammatical view of means for driving the feeding and discharging means; Fig. 6 is an end elevation, on an enlarged scale, of the feeding and discharging means of one of the disks; Fig. 7 is a side elevation of the feeding means of a disk, said disk being shown in section; Fig. 8 is a sectional view on the line 8—8, Fig. 7; Fig. 9 is a fragmentary top plan view of an alternative form of disk; and Fig. 10 is a sectional view on the line 10—10, Fig. 9.

The machine is supported on a foundation 1 that is formed of concrete, brick, or any other suitable material. A base casting 2 rests upon said foundation and is secured to same with anchor bolts 3, or the like. A plate 4 covers the top of casting 2 and supports a vertically-disposed casing 5, said casing being preferably cylindrical in shape and formed of metal. An angle-iron 6 is arranged to encircle the base of casing 5 and is fastened to casting 2 by means of bolts 7, or the like, in order to hold plate 4 and casing 5 firmly in place on said casting. The top of casing 5 is covered with a casting 8, which is held in place on said casing by means of an angle-iron 9 that encircles the top of said casing, said angle-iron 9 being fastened with bolts 10, or the like, to casting 8.

A hollow shaft 11 extends vertically through the middle of the interior of casing 5 and through an opening in plate 4, and, also, through an opening in web 12 of casting 2. An annular projection 13 extends upwardly from web 12 and surrounds flange 14 of a collar 15 rigidly mounted on shaft 11. A ring 16 that encircles shaft 11 seats in a depression 17 in web 12, and the upper surface of said ring is provided with an annular groove 18 to receive a plurality of balls 19. Another ring 16 encircles shaft 11 and rests upon balls 19, the lower surface of said ring, also, being grooved at 18 to allow balls 19 to travel therein. Flange 14 of collar 15 rests upon the upper ring 16 and supports shaft 11. The adjacent surfaces of a pair of concentric rings 20 are grooved at 21, respectively, to form a path of travel for a plurality of balls 22. The inner ring 20 encircles flange 14 of collar 15, and the outer ring 20 seats in a depression 23 in projection 13, thereby preventing transverse movement of shaft 11, one of said rings 20 being preferably a horizontally split ring to allow balls 22 to be placed in grooves 21.

The upper end of shaft 11 terminates within a short distance of the top casting 8 and bears a collar 24 that is rigidly mounted thereon. The lower flange of a pipe 25 is bolted, or secured by any other suitable means, to a flange 26 borne by collar 24. Said pipe extends through an opening in casting 8 and projects into a stuffing-box 27 in one end of an elbow 28, or the like, said opening being preferably lined with Babbitt metal 29, or the like. A sleeve 30 is loosely mounted on pipe 25 and is arranged to retain packing 31 in said stuffing-box, a flange 32 borne by said sleeve being fastened to a flange 33 of elbow 28 by means of bolts 34, or the like. The other end of elbow 28 is connected to an inlet pipe 35 that leads to any suitable source of steam supply (not shown in the drawings), said steam being either exhaust or live steam. The lower part of shaft 11 extends into an opening 36 in foundation 1 and bears a miter gear 37 that meshes with a miter gear 38 on shaft 39. Said shaft 39 is mounted in journal-box 40, supported on foundation 1, and is driven from any suitable source of power in order to drive shaft 11 by means of miter gears 37 and 38. The lower end of shaft 11 extends through a stuffing-box 41, borne by outlet pipe 42, and communicates with the interior of said outlet pipe. Said outlet pipe extends through an opening in foundation 1 and conveys the steam to a suitable discharging place. A sleeve 43 that is loosely mounted on shaft 11 retains packing 44 in stuffing-box 41 and is fastened to said stuffing-box by means of bolts 45, or the like.

A plurality of disks 46 are preferably arranged one above another within casing 5 and are disposed substantially horizontal. Each disk 46 is formed with a diameter that is nearly as large as the internal diameter of casing 5 and is provided with a hollow cylindrical part 47, which extends upwardly from the central part thereof and encircles shaft 11, and, also, with a flange 48 that projects downwardly from the periphery of said disk, said cylindrical part 47 being formed with such diameter relative to the diameter of shaft 11 that a passage 49 around said shaft is left within said cylindrical part. The cylindrical part 47 of the topmost disk 46 is secured to collar 24 by means of bolts 50, or the like. With the exception of the cylindrical part 47 of the topmost disk 46, each of the other cylindrical parts 47 is provided with a disk 51, which is approximately the same diameter as disk 46. A flange 52 is preferably formed on the periphery of disk 51 in order that same can be riveted or otherwise secured to flange 48 of an adjacent disk 46 thereabove, said disk 46 being spaced apart from disk 51 so that a space is left therebetween. Said space between disk 46 and a subjacent disk 51 is divided horizontally into compartments 53 and 54 by means of a diaphragm 55, the compartment 53 being above said diaphragm and communicating with a passage 49 thereabove, and the compartment 54 being below said diaphragm and communicating with a passage 49 therebeneath. Diaphragm 55 is diametrically smaller than disk 46 so that compartment 53 communicates with compartment 54, and is secured to shaft 11 in order to separate passages 49 adjacent thereto, the periphery of said diaphragm being supported on projections 56 that rest upon disk 51. Disk 46 is omitted entirely from the bottommost cylindrical part 47, and said cylindrical part is secured to collar 15 by means of bolts 57, or the like.

Heat, preferably in the form of steam, flows through pipe 35 and elbow 28 into pipe 25 which delivers same to the hollow shaft 11. Said shaft is plugged at 58 in order to cause the steam that enters said shaft to pass through apertures 59 in said shaft into the topmost passage 49. The steam enters the topmost compartment 53 from said passage 49, then fills said compartment and flows around the periphery of diaphragm 55 into the topmost compartment 54. The steam fills said compartment 54 and passes through the second passage 49 into the second compartment 53, and so on until same enters the bottommost passage 49. Exhaust ports 60 in shaft 11 communicate with the bottommost passage 49 and deliver the steam from said passage into the interior of said shaft. Said exhaust ports are located below plug 58 so that the steam that enters said shaft from said exhaust ports discharges through the lower end of said shaft into the outlet pipe 42. As the steam passes through compartments 53 and 54, the disks 46 and 51 become heated and radiate the heat into the interior of casing 5 with the result that the material that comes in contact with disks 46, in the manner hereinafter described, becomes thoroughly dried.

Each disk 46 is provided with a loading device which deposits the material thereon and, also, with an unloading device which removes the material from said disk after said disk moves the material through approximately one revolution. Said loading device consists of a trough 61 in which a shaft 62 bearing a spiral conveyer-blade 63 is arranged to extend longitudinally thereof. Trough 61 is supported by means of a plate or flange 64 that is fastened to casing 5 with bolts 65, or the like, and protrudes through an opening in said casing into the interior of same, said plate being preferably formed integrally with said trough and projecting outwardly from the sides and bottom thereof. Said trough is arranged to extend across part of disk 46, so that the bottom of same nearly touches said disk and terminates adjacent the cylindrical part 47 of said disk, and is disposed substantially at a right-angle to shaft 11. The inner end of trough 61 is closed by means of a plate 66, which is preferably formed integrally with the sides and bottom of said trough, and the outer end of said trough is left open to communicate with a chute 67, said chute being borne by plate 64 and projecting from the outside thereof. Shaft 62 is journaled in an opening in plate 66 and, also, in an opening in one side of chute 67. The spiral conveyer-blade 63 is arranged to extend into the interior of chute 67 and is rotated clockwise, Fig. 4, in order to cause the material that enters chute 67, in the manner hereinafter described, to pass from same into trough 61 and to move toward plate 66. One side of trough 61 is cut away at 68 to allow the material to discharge therefrom and to fall upon disk 46.

The disk 46 is rotated clockwise, Fig. 2, in order to cause the material that is deposited thereon to move away from the cut-away side 68 of trough 61 and to travel toward the unloading device that is located adjacent the other side 69 of said trough. Said unloading device comprises a shaft 70 that bears a spiral conveyer-blade 71, said shaft being disposed substantially parallel to the side 69 of trough 61 so that the periphery of said conveyer-blade nearly touches the side 69 and, also, disk 46. Plate 66 extends beyond side 69 and supports the inner end of shaft 70. The shaft 70 extends through an opening in one side of a chute 72 borne by plate 64, one side of said chute being left open in order to communicate with the interior of casing 5. The spiral conveyer-blade 71 is arranged to extend through the open side and into the interior of chute 74 and is rotated counter-clockwise, Fig. 4, in order to remove the material from disk 46 and to cause same to enter chute 72, the lower edge of side 69 being beveled at 73 to deflect the material from disk 46 into engagement with said conveyer-blade 71.

The chute 67 extends upwardly from shaft 62 to the upper edge of plate 64 and bears a flange 74, and the chute 72 extends downwardly from shaft 70 to the lower edge of plate 64 and bears a flange 75. Plates 64 are arranged one above another so that chute 72 registers with a chute 67 subjacent thereto, the flanges 74 and 75 being fastened together by means of bolts 76, or the like. The material to be dried is fed by any suitable means into a hopper 77 borne by the topmost chute 67, then is drawn by a spiral conveyer-blade 63 into trough 61 from which it falls upon the topmost disk 46. After the topmost disk moves the material through approximately one revolution, the conveyer-blade 71 removes the material from said disk and discharges same into the topmost chute 72, which delivers same to the second chute 67. The material that enters the second chute 67 is drawn by the second conveyer-blade 63 into the second trough 61 from which it falls upon the second disk 46, then is moved by the second disk 46 until the second conveyer-blade 71 scrapes the material from said second disk into the second chute 72 from which same passes into the third chute 67, and so on until the material discharges from the bottommost chute 72 into a suitable receptacle or conveyer (not shown in the drawings). As a conveyer-blade 71 removes the material from a disk 46 some of the material discharges into a chute 72 and some falls down the side of flange 48 of said disk. In order to prevent the material that falls down the side of said flange 48 from dropping to the bottom of casing 5, a deflector or apron 78 is arranged to catch said material and to discharge same into a chute 67, there being a similar deflector 78 provided for each disk 46.

Each shaft 62 bears a sprocket 79 that is connected by means of an endless chain 80 to a similar sprocket 79 borne by a shaft 62 adjacent thereto. Each shaft 70 bears a sprocket 81 that is connected by means of an endless chain 82 to a similar sprocket 81 borne by an adjacent shaft 70. The chains 80 and 82 are provided with idlers 83 and 84, respectively, to afford means for regulating the tension thereof. The bottommost shaft 62 bears a gear 85 that meshes with a gear 86 borne by the bottommost shaft 70, a sprocket 87 being mounted on said shaft 70 and driven by means of a chain 88 that receives its power from any suitable source. By this arrangement the shafts 62 are connected in series and the shafts 70 are likewise connected so that, when sprocket 87 is rotated in the direction indicated by the arrow, Fig. 5, all of the shafts 62 are caused to rotate clockwise and all of the shafts 70 are caused to rotate counter-clockwise.

When the moist material comes in contact with the heated disks 46, vapors and gases are given off from the material and for this reason it is necessary to exhaust same from the interior of casing 5. The means for exhausting the gas from the interior of casing 5 comprises a plurality of pipes 89 that are preferably arranged one above another and are connected to a pipe 90, said pipe 90 being connected to an exhaust fan (not shown in the drawings). Each pipe 89 partly encircles casing 5, and is provided with a valve 91, which controls the passage of the gas from same into pipe 90, and, also with a plurality of connections 92, which are attached to exhaust ports 93 in casing 5, said exhaust ports being preferably located a little above the level of a disk 46. Each connection 91 is provided with a valve 94 which controls the passage of the gas from the interior of casing 5 into pipe 89. By means of pipes 89 and pipe 90 any gas or vapor that forms within casing 5 is exhausted therefrom.

The disks 46 and 51 and diaphragm 55, hereinabove described, are formed of sheet metal but, when it is desired, discus-shaped castings 95 like the one depicted in Figs. 9 and 10 can be substituted therefor. Each casting 95 is preferably hollow and is divided into an upper compartment 96 and a lower compartment 97 by means of a horizontal partition 98, which is supported from the top and bottom of said casting by means of uprights 99, said partition being smaller diametrically than casting 95 so that an annular space 100 surrounding the periphery of said partition is left within said casting in order to allow the steam to pass from compartment 96 into compartment 97. Said casting 95 bears an upper sleeve 101 that communicates with compartment 96, and, also, a lower sleeve 102 that communicates with compartment 97, said sleeves 101 and 102 being provided with flanges 103 and 104, respectively, and arranged centrally of said casting. The castings 95 are arranged one above another within casing 5 so that flange 104 of sleeve 102 rests upon flange 103 of sleeve 101, said flanges being secured together by means of bolts 105, or the like. When said castings 95 are used, the flange 103 of the topmost sleeve 101 is fastened to the lower flange of pipe 25, and the flange 104 of the bottommost sleeve 102 is secured to flange 106 borne by collar 15, the upper end of shaft 11 terminating at said collar 15.

The operation of the machine is as follows: Power is applied to shaft 39, which in turn causes shaft 11 to rotate clockwise, Fig. 2, by means of the miter gears 38 and 37, thereby causing disks 46 to rotate with said shaft 11. Chain 88 is, also, set in motion with the result that shafts 62 and 70 are caused to rotate, as hereinabove described. The material to be dried is fed by any suitable means into hopper 77 which delivers same to the topmost conveyer-blade 63. The material is drawn into the upper trough 61 and is deposited upon the topmost disk 46. Said disk moves the material through approximately one revolution until same comes in contact with a conveyer-blade 71 which removes same from said disk, thereby causing the material to pass through a chute 72 and a chute 67 to the second conveyer-blade 63 that deposits same upon the second disk 46. Said second disk moves the material through approximately one revolution until same comes in contact with the second conveyer-blade 71 which removes the material from said second disk, whereby said material is caused to pass through a chute 72 and a chute 67 to the third conveyer-blade 63, and so on until the material discharges from the bottommost chute 72. Steam passes through the compartments 53 and 54, as hereinabove described, and heats disks 46 and 51, thereby causing said disks to radiate heat into the interior of casing 5 with the result that the material that comes in contact with said disks 46 becomes thoroughly dried before same discharges from the bottommost chute 72. If any vapor or gas generates within casing 5 while the material is being dried same is exhausted from the interior of said casing by means of pipes 89 and 90 and the fan (not shown).

I claim:

1. In a machine of the character described, the combination of a plurality of horizontally-disposed hollow members arranged one above another and being communicatively connected to allow a heating medium to pass therethrough, a vertically-disposed hollow shaft supporting said members and having inlet and exhaust ports, said pipe being plugged intermediate said inlet and exhaust ports, and means for supplying the heating medium to said shaft, said inlet ports communicating with the interior of one end member, and said exhaust ports communicating with the interior of the other end member.

2. In a machine of the character described, the combination of a plurality of horizontally-disposed hollow members arranged one above another and being communicatively connected to allow a heating medium to pass therethrough, a vertically-disposed hollow shaft supporting said members and being in communication with the end members, each of said members being divided interiorly into compartments through which the heating medium passes adjacent the top and bottom thereof, and means for supplying the heating medium to said shaft.

3. In a machine of the character described, the combination of a plurality of horizontally-disposed hollow members arranged one above another and being communicatively connected to allow a heating medium to pass therethrough, a vertically-disposed hollow shaft supporting said members and communicating with the interior of the end members, diaphragms projecting from said shaft into the interior of said members and arranged to divide said members interiorly into upper and lower compartments through which the heating medium passes adjacent the tops and bottoms thereof, and means for supplying the heating medium to said shaft.

4. In a machine of the character described, the combination of a plurality of rotary members, means for heating same, each of said members being provided with a trough arranged to deposit the material upon same, a spiral conveyer-blade arranged within said trough and adapted to feed the material into same, and a spiral conveyer-blade arranged adjacent said trough and adapted to remove the material from a member adjacent thereto.

5. In a machine of the character described, the combination of a foundation, a casting supported thereby and having an opening, a plurality of rotary members arranged one above another, a vertically-disposed shaft passing through the opening in said casting and supporting said members, a ball-bearing encircling said shaft and resting upon said casting, a collar borne by said shaft and arranged to rest upon said ball-bearing, a ball-bearing encircling said collar, and an annular projection borne by said casting and arranged to support said last-mentioned ball-bearing.

6. In a machine of the character described, the combination of a casing, a plurality of rotary hollow members arranged one above another within said casing and being communicatively connected, a vertically-disposed hollow shaft supporting said members and being in communication with the interior of each end member, a base casting in which said shaft is journaled, a pipe borne by the upper end of said shaft and being in communication therewith, a top casting in which said pipe is journaled, a heating medium supply pipe communicatively connected to said first-mentioned pipe, an exhaust pipe communicatively connected to the lower end of said shaft, and means for rotating said shaft.

7. In a machine of the character described, the combination of a casing, a plurality of rotary hollow members arranged one above another within said casing and being communicatively connected, a vertically-disposed hollow shaft supporting said members and being in communication with the interior of each end member, a base casting in which said shaft is journaled, a foundation supporting said casing and having an opening into which the lower end of said shaft extends, a gear borne by said shaft, a drive shaft, a gear borne by said drive shaft and meshing with said first-mentioned gear, an exhaust pipe extending into the opening in said foundation and communicating with the lower end of said shaft, said exhaust pipe bearing a stuffing-box in which the lower end of said shaft revolves and means for introducing a bearing medium into the upper end of said shaft.

8. In a machine of the character described, the combination of a casing, a plurality of rotary hollow members arranged one above another within said casing and being communicatively connected, a vertically-disposed hollow shaft supporting said members and communicating with the interior of each end member, a pipe borne by the upper end of said shaft, a top casting in which said pipe is journaled, a heating medium supply pipe communicatively connected to said first-mentioned pipe, and said supply pipe bearing a stuffing-box in which the upper end of said first-mentioned pipe revolves.

9. In a machine of the character described, the combination of a casing, a plurality of rotary disks arranged one above another within said casing, means for heating said disks, troughs arranged one above another within said casing and adapted to deposit the material upon said disks, spiral conveyer-blades adapted to feed the material into said troughs, spiral conveyer-blades adapted to remove the material from said disks, chutes arranged to deliver the material from one disk to another, a hopper arranged to deliver the material to the topmost trough, a discharge spout arranged to receive the material that is removed from the bottom-most disk, and means for operating said conveyer-blades.

10. In a machine of the character described, the combination of a casing, a plurality of hollow-rotary disks arranged therein and communicatively connected together to allow a heating medium to pass therethrough, separate loading means mounted above each disk, means for delivering material from the unloading means above each disk to the loading means above the next lower disk, and means for delivering a heating medium to the interiors of said disks.

11. In a machine of the character described, the combination of a casing, a plurality of rotary disks arranged therein, a vertical shaft to which said disks are secured one above another, a loading device mounted above each disk, a separate unloading device mounted above each disk and comprising a trough and a spiral conveyer located in said trough, and chute connections between the trough above each disk and the loading device above the next lower disk, for delivering the material from one disk to another.

12. In a machine of the character described, the combination of a casing, a plurality of rotary disks arranged therein, a vertical shaft to which said disks are secured one above another, a loading device and an unloading device mounted above each disk, each device comprising a trough and a spiral conveyer located therein, and chute connections between the unloading trough above each disk and the loading trough above the next lower disk, for delivering the material from one disk to another.

13. In a machine of the character described, the combination of a casing, a plurality of rotary disks arranged therein, a vertical shaft to which said disks are secured one above another, a loading device mounted above each disk and comprising a trough and a spiral conveyer located therein, a separate unloading device mounted above each disk, and chute connections between the unloading device above each disk and the trough above the next lower disk, for delivering the material from one disk to another.

14. In a machine of the character described, the combination of a casing, a vertical shaft extending therethrough, means for rotating said shaft, a plurality of disks secured one above another to said shaft, a loading spiral conveyer and an unloading spiral conveyer mounted above each disk, means for rotating all of said unloading conveyers simultaneously in one direction, means for rotating all of said loading conveyers, simultaneously, in the opposite direction, and means for delivering material from the unloading conveyer above each disk to the loading conveyer above the next lower disk.

15. In a machine of the character described, the combination of a casing, a vertical shaft extending therethrough, means for rotating said shaft, a plurality of disks secured one above another to said shaft, a loading spiral conveyer and an unloading spiral conveyer mounted above each disk, means for rotating all of said unloading conveyers simultaneously in one direction, means for rotating all of said loading conveyers in unison, gear connections between said driving means for causing the first-named conveyers to rotate in the opposite direction from the second-named conveyers, and means for delivering material from the unloading conveyer above each disk to the loading conveyer above the next lower disk.

16. In a machine of the character described, the combination of a casing, a vertical shaft extending therethrough, means for rotating said shaft, a plurality of disks secured one above another to said shaft, a loading spiral conveyer and an unloading spiral conveyer mounted above each disk, means for rotating all of said unloading conveyers simultaneously in one direction, means for rotating all of said loading conveyers simultaneously in the opposite direction, and chute connections between the unloading conveyer above each disk and the loading conveyer above the next lower disk.

17. In a machine of the character described, the combination of a casing, a hollow vertical shaft extending therethrough, a plurality of hollow rotary disks secured to said shaft one above another and provided each with a cylindrical portion encircling said shaft and arranged in spaced relation to the same, to provide an annular passage through which a heating medium may flow, the cylindrical portion of each disk being connected with the next higher disk, a pair of collars secured to said shaft and connected one with the topmost disk and the other with the lowermost disk, said shaft being provided with inlet ports located adjacent one of said collars, and with exhaust ports located adjacent the other collar, a plug fitted in said shaft intermediate said inlet and exhaust ports, and means for delivering the heating medium into the end of said shaft adjacent said inlet ports.

18. In a machine of the character described, the combination of a casing, a plurality of hollow horizontal members arranged one above another therein and communicatively connected together to allow a heating medium to pass therethrough, a vertical shaft to which said members are secured, each of said members being divided interiorly into compartments through which the heating medium passes adjacent the top and bottom thereof, means for supplying the heating medium to said members, means for rotating said shaft, a loading and unloading device mounted above each member, and means for delivering material from the unloading device above each member to the loading device above the next lower member.

19. In a machine of the character described, the combination of a casing, a plurality of hollow horizontal members arranged one above another therein and communicatively connected together to allow a heating medium to pass therethrough, a vertical shaft to which said members are secured, each of said members being divided interiorly into compartments through which the heating medium passes adjacent the top and bottom thereof, means for supplying the heating medium to said members, means for rotating said shaft, a loading and unloading device mounted above each member, and chute connections between the unloading device above each member and the loading device above the next lower member, for delivering material from one disk to another.

20. In a machine of the character described, the combination of a casing, a vertical shaft extending thereinto, a plurality of disks secured one above another to said shaft, means for rotating said shaft, a loading and an unloading device mounted above each disk, chute connections between the unloading device above each disk and the loading device above the next lower disk, for delivering material from one disk to another, and deflectors communicating with said chute connections and located adjacent the peripheral edges of said disks for delivering material falling from said edges into said chute connections.

21. In a machine of the character described, the combination of a casing, means for heating the interior thereof, a vertical shaft extending into said casing, means for rotating said shaft, a plurality of members secured one above another to said shaft, means for delivering material from one member to another, a main exhaust pipe arranged exteriorly of said casing, a plurality of superposed pipes encircling said casing and opening into said main pipe, and a plurality of branch pipes leading from said superposed pipes and opening into said casing.

In testimony whereof I have hereunto affixed my signature in the presence of two witnesses.

WILLIAM R. MACKLIND.

Witnesses:
   EDW. T. WALLACE,
   FRED. A. VEDINER.